Dec. 9, 1941.                    H. ZIEBOLZ                      2,265,961
            FLOW MEASURING AND CONTROL APPARATUS FOR
                  RECIRCULATING BURNER INSTALLATIONS
                        Filed Jan. 27, 1939
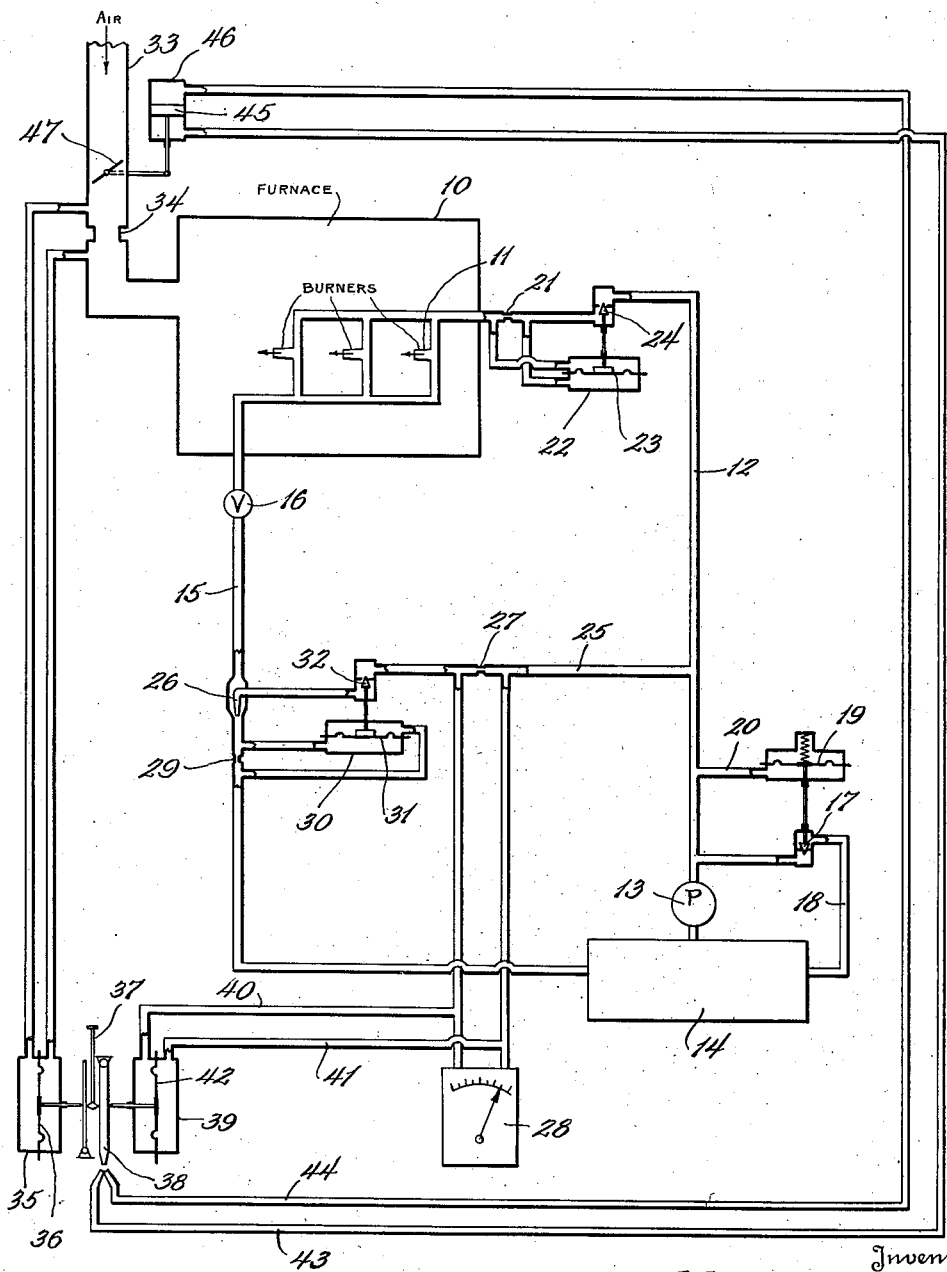
Inventor
Herbert Ziebolz
By A. D. Adams
Attorney Patented Dec. 9, 1941

2,265,961

UNITED STATES PATENT OFFICE 2,265,961

FLOW MEASURING AND CONTROL APPARATUS FOR RECIRCULATING BURNER INSTALLATIONS

Herbert Ziebolz, Chicago, Ill., assignor, by mesne assignments, to Askania Regulator Company, Chicago, Ill., a corporation of Illinois Application January 27, 1939, Serial No. 253,175

13 Claims. (Cl. 158—1)

This invention relates to flow measuring and control apparatus for recirculating oil burner installations and, among other objects, aims to provide relatively simple, economical and reliable apparatus for measuring the flow of oil or liquid fuel to such burners. Another aim is to create controlling impulses by such measuring apparatus so that they may be used for proportioning the flow of oil and air to such burners or for other purposes.

Other aims and advantages of the invention will appear in the specification, when considered in connection with the accompanying drawing, wherein:

The figure is a diagrammatic illustration of a burner installation showing one form of flow measuring and control apparatus embodying the invention.

In recirculating burner installations wherein oil is supplied to the burners at a greater rate than it is consumed and the excess oil is returned to the source of supply, the problem of measuring the oil flow to the burners presents difficulties because of the fact that only a portion of the oil supplied is returned to the source. Therefore, to obtain a correct measurement of the oil consumed, it has heretofore been necessary to subtract the return flow from the amount of oil delivered by the pump. This requires two measurements instead of one and the subtraction of two readings to obtain an impulse which represents the flow of oil actually being consumed. It has heretofore been suggested that the supply be maintained constant and only the return flow measured. Unfortunately, the impulses obtained in this manner are of the greatest magnitude for a minimum flow while they are a minimum for the maximum flow. This complicates the measuring and control equipment and seriously impairs the accuracy at high rates of flow through the burners. If, for example, the return flow is only 10% of the oil delivered, this means that 90% of the oil is being consumed. As an instrument for measuring such a flow is usually inaccurate, the error in its readings may be comparatively high. When such an instrument is employed to operate a proportioning control device, the combustion control is therefore subject to the same error. Even though errors may be permissible at low burner ratings, it is impossible to compensate for them when operating at high burner ratings or high rates of flow. This invention overcomes these difficulties by creating an oil flow in a separate pipe or branch which is equal to the flow of oil consumed and employing a single meter or measuring device which is dependable for all burner ratings and its accuracy is the same as can be obtained in connection with burners of the non-recirculating type.

In accordance with this invention, the return flow of oil from the burners is supplemented by adding make-up oil, the flow of which is equal to the amount of oil actually consumed. Oil is preferably delivered to the burners under a constant supply pressure and at a constant rate and the return flow, including the make-up oil, is maintained at the same rate. However, if the rate of delivery is variable, the supplemental return flow could be varied accordingly by well known proportioning control apparatus. In either case, the measurement of the flow of the make-up oil is always equal to the flow through the burners or the amount of oil actually consumed. This makes it possible to employ well known metering devices instead of complicated measuring apparatus heretofore proposed. Moreover, impulses for controlling combustion may be obtained from the meter or measuring device and applied in a well known manner, as will be explained.

Referring particularly to the embodiment of the invention illustrated in the drawing, there is shown a furnace 10 having a plurality of recirculating burners 11 supplied with oil by a delivery pipe 12 from a pump 13 connected to a tank 14. The unused oil is returned to the tank 14 through a return pipe 15 having a burner control valve 16, it being understood that when the valve is closed the burners operate at their full capacity and when it is opened the oil flow through the burners is a minimum.

In this instance, the oil delivered by the pump is maintained at a constant pressure conveniently by means of a pressure regulating valve 17 in a by-pass pipe 18. The pressure regulator may be of any of the well known types, but is shown as being in the form of a spring loaded diaphragm 19 the chamber of which communicates with the pipe 12 through a branch 20. The rate of flow to the burners at the constant delivery pressure is also maintained constant by any well known type of constant flow valve. In this instance, the delivery pipe has a restriction or orifice plate 21 on the opposite sides of which is connected a diaphragm chamber 22 carrying a weight loaded diaphragm 23 which controls a valve 24 in the delivery pipe.

It will be understood that the oil actually consumed by the burners is subtracted from the total flow and the excess is returned through the return pipe 15. It will therefore be seen that if the return flow is supplemented and maintained at a constant rate of flow equal to the rate of flow supplied through the delivery line, the make-up flow will be equal to the flow of oil consumed by the burners. In this instance, make-up oil is shown as being supplied from the delivery line 12 through a pipe or branch 25 and an injector nozzle 26 in the return line 15. However, the make-up oil may be supplied from a separate source. The flow through the branch 25 may be measured by any reliable type of meter, such, for example, as the one disclosed in copending application Ser. No. 117,041, filed December 21, 1936. However, in this instance, the pipe is shown as having a restriction or orifice plate 27 and a meter 28 is connected on opposite sides thereof. The return flow is maintained constant in the return line below the nozzle 26 by means of a restriction or orifice plate 29 on the opposite sides of which is connected diaphragm chamber 30 carrying a weighted diaphragm 31 which operates a control valve 32 in the make-up line. The arrangement is such that as the return flow through the valve 16 decreases, the control valve 32 is opened wider to increase the flow of make-up oil at the same rate as the oil is consumed by the burners. Thus, the scale of the meter 28 may be calibrated to read directly in terms of the amount of flow.

Obviously, the impulses created by the differential pressure on opposite sides of the restriction or orifice plate 27 in the make-up line can be employed in the well known manner to control the combustion. In this instance, the supply of air to support combustion in the furnace is proportioned to the flow of oil, but it is to be understood that they may also be used for controlling either air or oil. For the purpose of controlling the supply of air, the air conduit 33 leading to the furnace is shown as having a restriction or orifice plate 34 on opposite sides of which is connected a diaphragm chamber 35 carrying a diaphragm 36 acting through a ratio slider 37 on a jet pipe 38 of the well known "Askania" type. On the opposite side of the jet pipe is a diaphragm chamber 39 connected by pipes 40 and 41 to communicate with the opposite sides of the restriction or orifice plate 27 in the make-up line and carrying a diaphragm 42 which applies the control impulses to the jet pipe 38. The jet pipe is arranged to deliver a jet of oil or other fluid through either of two pipes 43 and 44 to actuate a piston 45 in a cylinder 46, which, in turn, operates a damper or valve 47 in the air conduit.

From the foregoing description, it will be seen that the improved apparatus is very simple in its construction, reliable in operation and easy to apply to any recirculating burner installation.

Obviously, the present invention is not restricted to the particular embodiment thereof herein shown and described.

What is claimed is:

1. Apparatus for measuring the quantity of oil consumed by a recirculating burner installation comprising, in combination oil delivery and return conduits; a pump connected to supply oil; means to maintain a constant pressure and rate of flow in the oil delivery conduit; a branch pipe connected to the delivery conduit and discharging make-up oil into the oil return conduit; means in the branch pipe responsive to the flow in the return conduit to maintain the total flow of the return and make-up oil the same as that in the delivery conduit, whereby the supply of make-up oil is equal to the quantity of oil consumed; and a meter connected to measure the make-up oil.

2. Apparatus for measuring the quantity of oil consumed by a recirculating burner installation comprising, in combination oil delivery and return conduits; a pump connected to supply oil; means to maintain a constant pressure and rate of flow in the oil delivery conduit; a branch pipe connected to the delivery conduit and discharging make-up oil into the oil return conduit; a restriction in said return conduit beyond the point of introduction of the make-up oil; a diaphragm operated valve controlling the flow of make-up oil in response to the pressure differential on opposite sides of said restriction to maintain the flow of the combined return and make-up oil the same as that in the oil delivery conduit; and means to measure the flow of the make-up oil.

3. Apparatus for measuring the quantity of oil consumed by a recirculating burner installation comprising, in combination oil delivery and return conduits; means to supply oil at a constant rate through the oil delivery conduit; means to inject make-up oil from the delivery conduit into the oil return conduit; means responsive to the flow of oil in the return conduit beyond the injection means to maintain the rate of flow of the combined return and make-up oil the same as that in the oil delivery conduit; and a meter connected to measure the make-up oil.

4. In a fluid consuming installation of the recirculating type having fluid delivery and return conduits, the combination of means to supply the fluid through the delivery conduit and means to return the unused fluid through the return conduit, means to introduce make-up fluid into said return conduit; means in the make-up fluid means and connected to and responsive to the return flow in the return conduit to maintain the flow of said make-up fluid equal to the amount of fluid actually consumed; and means responsive to said make-up fluid flow.

5. Apparatus for measuring the quantity of oil consumed by a recirculating burner installation comprising, in combination, oil delivery and return conduits; means to supply oil at a constant rate through the oil delivery conduit; means to inject make-up oil into the oil return conduit including a valve; a valve in the return conduit; a diaphragm connected to operate said valve and connected to be actuated in response to the combined flow of the returned and make-up oil to maintain the total return flow constant and the same as that in the delivery conduit, so that the make-up flow is equal to the quantity of oil consumed; and means connected to be responsive to the make-up flow.

6. In combination with a recirculating fluid fuel burner installation having a return conduit for unused fuel, a make-up conduit connected to supply make-up fuel to supplement the returning fuel; means to control the rate of flow of fuel actually consumed; means connected to obtain direct measuring impulses from the make-up flow; and means connected to be operated by said impulses to control the relative supply of fuel and air to the burners.

7. In combination with a recirculating fluid fuel burner installation having a return conduit for unused fuel, a make-up conduit connected to supply make-up fuel to supplement the returning fuel and an air supply means; means to control the rate of flow of make-up fuel so that it is a function of the rate of flow of fuel actually consumed; means connected to obtain direct measuring impulses from the make-up flow; measuring means connected to be operated by said impulses to determine the quantity of fuel actually consumed; and means responsive to said impulses to control the air supply means in proportion to the make-up fuel.

8. In a recirculating fluid fuel burner installation of the type set forth in claim 6 wherein a regulator is connected to be operated by said impulses, means to control the supply of combustion supporting air connected to be operated by said regulator.

9. In combination with a recirculating burner installation having oil supply and oil return conduits, an oil delivery pump connected to the supply conduit; a make-up oil conduit connected to the return conduit; control means connected to maintain the rate of flow of make-up oil always a function of the rate of flow of oil actually consumed; means to produce measuring impulses from the make-up flow; and proportioning control means connected to be operated by said impulses to maintain the ratio of air and consumed oil substantially constant.

10. Apparatus for measuring the quantity of fluid consumed by a fluid consuming installation of the recirculating type comprising, in combination, fluid delivery and return conduits, means to supply fluid through the fluid delivery conduit, means to inject make-up fluid into the fluid return conduit including a valve, means to operate said valve in response to the combined flow of the returned and make-up fluid to maintain the return flow the same as that in the delivery conduit, so that the make-up flow is equal to the quantity of fluid consumed, and means connected to be responsive to the make-up flow.

11. Apparatus for measuring the quantity of oil consumed by a recirculating burner installation comprising, in combination, oil delivery and return conduits; means to supply oil at a constant rate through the oil delivery conduit; a make-up oil conduit connected to the oil return conduit and including means to inject oil into the oil return conduit and a valve; a diaphragm connected to operate said valve and connected to be actuated in response to the combined flow of the returned and make-up oil to maintain the total return flow constant and the same as that in the delivery conduit, so that the make-up flow is equal to the quantity of oil consumed; and means connected to the make-up oil conduit responsive to the make-up flow to maintain the flow of combustion air in proper proportion to the consumed oil.

12. Apparatus for measuring the quantity of fuel consumed by a recirculating burner installation comprising, in combination, fuel oil delivery and return conduits; a make-up fuel conduit connected to the return conduit and discharging make-up fuel into the return conduit; a restriction in said return conduit beyond the point of introduction of the make-up fuel; a diaphragm operated valve controlling the flow of make-up fuel in response to the pressure differential on opposite sides of said restriction to maintain the flow of the combined return and make-up fuel the same as that in the fuel delivery conduit; and means to measure the flow of the make-up fuel to determine the amount of fuel consumed.

13. Apparatus according to claim 12, in which air inlet means are provided for the burner; and in which means are provided connected to the make-up flow measuring means to adjust the air inlet means in dependence upon the amount of the make-up fuel flowing in the make-up fuel conduit.

HERBERT ZIEBOLZ.